(12) United States Patent
Bradley

(10) Patent No.: US 7,231,061 B2
(45) Date of Patent: Jun. 12, 2007

(54) ADAPTIVE PREDICTION FILTERING FOR DIGITAL WATERMARKING

(75) Inventor: Brett A. Bradley, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 820 days.

(21) Appl. No.: 10/349,321

(22) Filed: Jan. 21, 2003

(65) Prior Publication Data

US 2003/0177359 A1 Sep. 18, 2003

Related U.S. Application Data

(60) Provisional application No. 60/351,502, filed on Jan. 22, 2002.

(51) Int. Cl.
*G06K 9/00* (2006.01)
*H04N 1/40* (2006.01)
*H04L 9/00* (2006.01)

(52) U.S. Cl. .................. 382/100; 358/3.28; 713/176
(58) Field of Classification Search ................ 382/100; 358/3.28; 713/176
See application file for complete search history.

(56) References Cited

U.S. PATENT DOCUMENTS

| | | | |
|---|---|---|---|
| 4,237,484 A | 12/1980 | Brown et al. | |
| 4,313,197 A | 1/1982 | Maxemchuk | |
| 4,855,697 A | 8/1989 | Jones et al. | |
| 4,907,156 A | 3/1990 | Doi et al. | |
| 4,972,471 A | 11/1990 | Gross et al. | |
| 5,101,432 A | 3/1992 | Webb | |
| 5,175,710 A | 12/1992 | Hutson | |
| 5,319,735 A | 6/1994 | Preuss et al. | |
| 5,659,726 A | 8/1997 | Sandford et al. | |
| 5,699,079 A | 12/1997 | Gossett | |
| 5,768,426 A | 6/1998 | Rhoads | |
| 5,825,892 A | 10/1998 | Braudaway et al. | |
| 5,832,119 A | 11/1998 | Rhoads | |
| 5,841,886 A | 11/1998 | Rhoads | |
| 5,841,978 A | 11/1998 | Rhoads | |
| 5,848,155 A * | 12/1998 | Cox ........................... 382/191 | |

(Continued)

FOREIGN PATENT DOCUMENTS

EP 0855829 7/1998

(Continued)

OTHER PUBLICATIONS

U.S. Appl. No. 60/351,502, filed Jan. 22, 2002, Bradley.

(Continued)

*Primary Examiner*—Andrew W. Johns
*Assistant Examiner*—Anthony Mackowey

(57) ABSTRACT

The disclosure describes methods for adaptive prediction filtering for digital watermarking applications. The predictive filter is designed to predict the digital watermark signal. In one implementation, there are two stages of prediction filtering. A first stage operates on a suspect signal before detecting any watermark in that signal. This stage adapts the predictive filter to local signal characteristics. A second stage uses known watermark signal elements to adapt a non-linear filter used in extracting message symbols from the suspect signal. This stage produces detection statistics based on a comparison of expected and measured message symbol values, and uses these statistics to adapt the parameters of a predictive filter. This adapted prediction filter is then applied to extract message symbol estimates.

20 Claims, 4 Drawing Sheets

U.S. PATENT DOCUMENTS

| | | | |
|---|---|---|---|
| 5,850,481 A | 12/1998 | Rhoads | |
| 5,859,920 A | 1/1999 | Daly et al. | |
| 5,862,260 A | 1/1999 | Rhoads | |
| 5,889,868 A | 3/1999 | Moskowitz | |
| 5,933,798 A | 8/1999 | Linnartz | |
| 6,031,914 A | 2/2000 | Tewfik | |
| 6,122,403 A | 9/2000 | Rhoads | |
| 6,154,571 A * | 11/2000 | Cox et al. | 382/250 |
| 6,157,330 A * | 12/2000 | Bruekers et al. | 341/143 |
| 6,233,684 B1 * | 5/2001 | Stefik et al. | 713/176 |
| 6,243,480 B1 * | 6/2001 | Zhao et al. | 382/100 |
| 6,259,801 B1 | 7/2001 | Wakasu | |
| 6,272,176 B1 | 8/2001 | Srinivasan | |
| 6,310,962 B1 | 10/2001 | Chung et al. | |
| 6,330,673 B1 | 12/2001 | Levine | |
| 6,341,350 B1 | 1/2002 | Miyahara et al. | |
| 6,345,100 B1 | 2/2002 | Levine | |
| 6,359,985 B1 | 3/2002 | Koch et al. | |
| 6,424,725 B1 | 7/2002 | Rhoads et al. | |
| 6,442,284 B1 | 8/2002 | Gustafson et al. | |
| 6,516,079 B1 * | 2/2003 | Rhoads et al. | 382/100 |
| 6,535,617 B1 | 3/2003 | Hannigan et al. | |
| 6,557,103 B1 | 4/2003 | Boncelet, Jr. et al. | |
| 6,563,936 B2 | 5/2003 | Brill et al. | |
| 6,614,914 B1 | 9/2003 | Rhoads et al. | |
| 6,681,027 B1 | 1/2004 | Rhoads | |
| 6,681,029 B1 | 1/2004 | Rhoads | |
| 6,757,405 B1 * | 6/2004 | Muratani et al. | 382/100 |
| 6,760,463 B2 | 7/2004 | Rhoads | |
| 6,763,121 B1 * | 7/2004 | Shaked et al. | 382/100 |
| 6,782,116 B1 | 8/2004 | Zhao et al. | |
| 6,952,774 B1 * | 10/2005 | Kirovski et al. | 713/176 |
| 6,988,202 B1 | 1/2006 | Rhoads et al. | |
| 7,013,023 B2 * | 3/2006 | Ehrmann Patin et al. | 382/100 |
| 7,076,082 B2 | 7/2006 | Sharma | |
| 2001/0032313 A1 | 10/2001 | Haitsma et al. | |
| 2002/0029338 A1 | 3/2002 | Bloom et al. | |
| 2002/0054355 A1 * | 5/2002 | Brunk | 358/3.28 |
| 2002/0057823 A1 | 5/2002 | Sharma et al. | |
| 2002/0078359 A1 * | 6/2002 | Seok et al. | 713/176 |
| 2002/0087863 A1 * | 7/2002 | Seok et al. | 713/176 |
| 2002/0090110 A1 | 7/2002 | Braudaway et al. | |
| 2002/0126870 A1 * | 9/2002 | Wendt | 382/100 |
| 2002/0157005 A1 | 10/2002 | Brunk et al. | |
| 2003/0072467 A1 * | 4/2003 | Brundage et al. | 382/100 |
| 2003/0091213 A1 | 5/2003 | Yamakage et al. | |
| 2003/0219144 A1 | 11/2003 | Rhoads et al. | |
| 2004/0030899 A1 | 2/2004 | Lee et al. | |
| 2004/0101160 A1 * | 5/2004 | Kunisa | 382/100 |

FOREIGN PATENT DOCUMENTS

| | | |
|---|---|---|
| WO | WO01/39121 | 5/2001 |
| WO | WO02/13138 | 2/2002 |

OTHER PUBLICATIONS

Kutter, Performance Improvement of Spread Spectrum Based Image Watermarking Schemes Through M-ary Modulation Dresden Information Hiding Workshop, 1999, pp. 245-259.

Kim, H., "Stochastic Model Based Audio Watermark and Whitening Filter for Improved Detection," Proc. IEEE Int. Conf. on Acoustics, Speech, and Signal Processing, Jun. 2000, pp. 1971-1974.

Alattar, "Bridging Printed Media and the Internet via Digimarc's Watermarking Technology," 8.sup.th ACM Int'l Multimedia Conf., Nov. 4, 2000, 5 pages.

Alattar, "Smart Images Using Digimarc's Watermarking Technology," SPIE 12.sup.th Int'l Symposium on Electronic Imaging, vol. 3971, No. 25, pp. 1-10, Jan. 1, 2000.

Bender et al., "Applications for Data Hiding," IBM Systems Journal, vol. 39, Nos. 3&4, 2000, pp. 547-568.

Kutter, Performance Improvement of Spread Spectrum Based Image Watermarking Schemes Through M-ary Modulation, Dresden Information Hiding Workshop, 1999, pp. 245-259.

Linnartz et al., Philips Electronics Response to Call for Proposals Issued by the Data Hiding SubGroup, Copy Protection Technical Working Group, Sep. Sep. 1997, 32 pages.

* cited by examiner

ADAPTIVE PREDICTION FILTERING FOR DIGITAL WATERMARKING

RELATED APPLICATION DATA

This application claims the benefit of U.S. Provisional Application 60/351,502, filed Jan. 22, 2002, which is hereby incorporated by reference.

TECHNICAL FIELD

The invention relates to digital watermarking.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 (now U.S. Pat. No. 6,614,914) and U.S. Pat. No. 6,122,403, which are herein incorporated by reference.

The disclosure describes methods for adaptive prediction filtering for digital watermarking applications. The predictive filter is designed to predict the digital watermark signal. In one implementation, there are two stages of prediction filtering. A first stage operates on a suspect signal before detecting any watermark in that signal. This stage adapts the predictive filter to local image characteristics. A second stage uses known watermark signal elements to adapt a non-linear filter used in extracting message symbols from the suspect signal. This stage produces detection statistics based on a comparison of expected and measured message symbol values, and uses these statistics to adapt the parameters of a predictive filter. This adapted prediction filter is then applied to extract message symbol estimates.

In one implementation, the first adaptive filter stage selects a filter for use in detecting a watermark and determining geometric synchronization. The second adaptive filter selects a filter (e.g., non-linear filter parameters) for use in extracting values of unknown message symbols from the variable portion of a digital watermark signal. The results produced in analyzing the known watermark signal may be used to refine the adaptive filter used in the geometric synchronization stage. In addition, the results produced in analyzing the known watermark signal may be used to as an indicator of watermark signal reliability to isolate areas of the suspect signal in which to perform watermark synchronization and message signal extraction.

The watermark embedder may be designed for a particular application by training the embedder on a test set of signal content with known watermark signals. Using the known signals, the training program can derive the appropriate non-linear embedding function and corresponding prediction filter. The non-linear embedding function for images, for example, adjusts each pixel relative to its neighbors so as to optimize the chances of accurate message symbol recovery as a function of the corresponding non-linear prediction filter and perceptual quality constraints.

Finally, the above techniques may be used to optimize and detect fragile watermarks to detect host signal alteration and copying.

Further features will become apparent with reference to the following detailed description.

DETAILED DESCRIPTION

Figure 1:
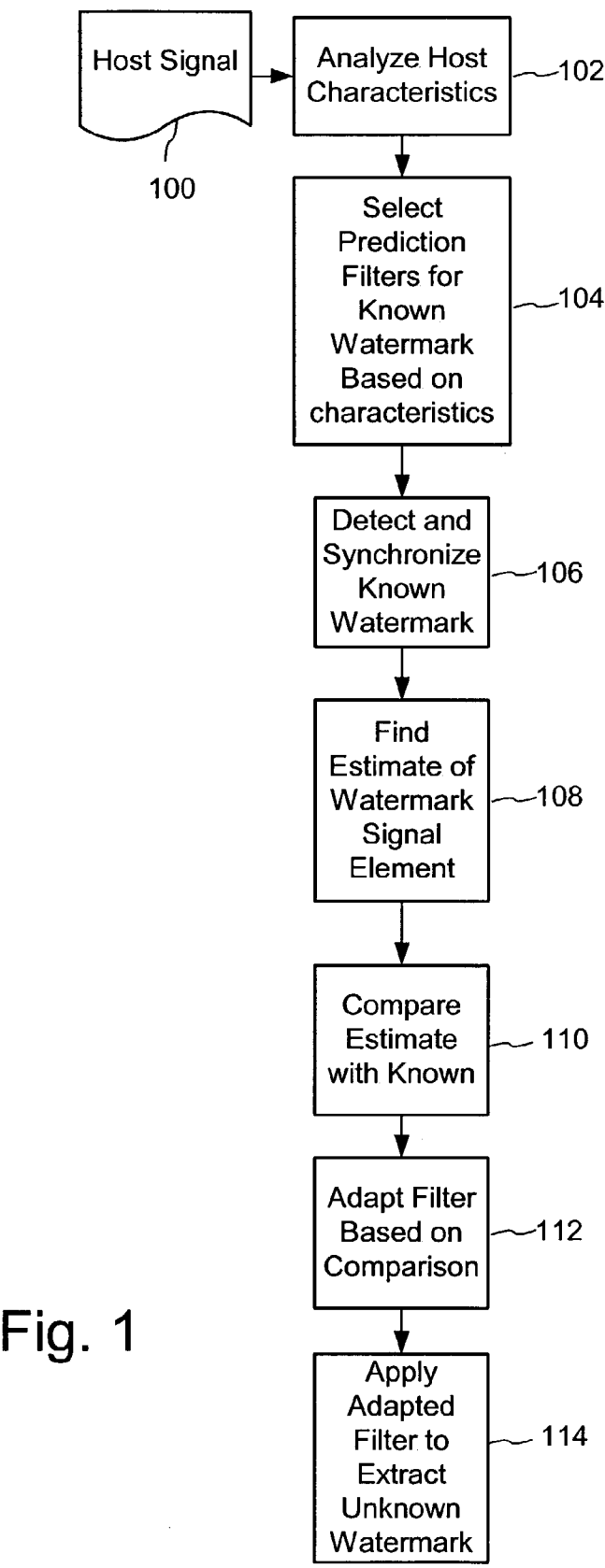
FIG. 1 is a flow diagram illustrating an implementation of adaptive prediction filtering in a digital watermarking system.

In the context of this document, predictive filtering refers to a signal processing method used in digital watermarking to predict the digital watermark signal in a potentially corrupted version of a watermarked signal. This signal may be an image, audio, or video signal. For the sake of illustration, we use the example of a watermark embedded in an image.

Though the details of digital watermark embedding vary from one method to the next, a large class of digital watermark embedding functions may be represented as a function that adjusts the value of a host signal sample up or down relative to its neighbors to represent a binary one or zero, respectively. The prediction filter analyzes the values of a local neighborhood of samples around a sample to predict whether that sample location represents an embedded one or zero (or other message symbol).

Our adaptive prediction filter uses attributes of the host signal or known watermark to adapt the filter operation to the received signal. Initially, when the watermark detector receives a signal suspected of containing a hidden watermark, it uses attributes of the host signal to select the appropriate prediction filter to make an initial detection of the watermark. The predictive filter operates on small groups of contiguous samples. Since the suspect host signal attributes often change across these sample groups, the predictive filter may also change to adapt to the changing attributes of the host signal.

To make an initial detection, the detector searches for a known portion of the watermark signal. This portion has known characteristics that facilitate detection and calibration of the detector in the received signal to compensate for geometric distortion. (Or temporal distortions for media with a temporal component like audio and video).

Once the detector has made an initial detection of the digital watermark and has geometrically aligned the host signal samples, it adapts the predictive filter for watermark message symbol decoding based on known parts of the watermark signal. These known parts of the watermark signal correspond to sample locations where the change in the sample value relative to its neighbors due to the watermark is known. For example, it may be known that the embedder adjusted the sample up relative to its neighbors or down relative to its neighbors. Knowing the expected adjustment at these locations enables the detector to select the predictive filter that most accurately predicts that adjustment.

In the case of a watermarked image, the known watermark locations are interspersed with variable watermark locations. In particular, the known watermark locations are interleaved with or even overlap areas in the image where a variable watermark signal is embedded. This embedding protocol enables the detector to change the predictive filter adaptively in different areas based on the analysis of the known watermark signal in those areas.

After selecting the appropriate prediction filter for each region in the host signal, the detector proceeds to apply that predictive filter to extract estimates of an unknown, variable message signal. This variable message can be used to carry information unique to the particular signal, such as an identifier or control instruction. Virtually any type of data may be carried in the variable message, limited by the variable message capacity. This capacity is limited by the constraints of the application, including the robustness of the message to survive intentional and un-intentional corruption and the desired perceptual quality of the host signal.

In some applications, the process of the adaptive filter can be performed iteratively as the detector extracts symbols from the variable watermark signal. For example, in one implementation, variable message symbols are error correction encoded along with error detection symbols, such as a Cyclic Redundancy Check (CRC). After decoding the variable message symbols and verifying their accuracy with the error detection bits, the decoded part of the watermark signal now becomes a known watermark signal. The detector can then use this newly discovered known watermark signal to further adapt the predictive filter in the same manner as described above for the known watermark signal.

In many applications, there is no need to go to the extent of adapting the predictive filter on decoded portions of the variable watermark signal. However, this process can be useful in applications where a detailed analysis of the entire watermark signal is used to detect corruption of the host signal. This application of digital watermarking is sometimes referred to as "fragile" or "semi-fragile" watermarking because the watermark is designed to degrade in response to certain types of processing, enabling the watermark to indicate whether that type of processing has occurred. For example, a fragile watermark can be used to detect whether a copy has been made to a document, or whether a music or video file has been compressed.

The predictive filter can be designed so that it is efficiently adapted using the techniques described above. The primary function of the predictive filter is to analyze the relative values of a sample and its surrounding neighbors. In our implementation for watermarked image data, the predictive filter compares the value of a center pixel with each of its eight immediate neighbors. This comparison provides an intermediate output which may be weighted or un-weighted. For example, in some versions of the predictive filter, certain neighboring sample locations may be given no weight, while others may be given greater weight by multiplication of a scale factor. The comparison between the center value and neighbor value may provide a difference value, or simply a sign value indicating whether the neighbor is greater or less than the pixel value at the center. The predictive filter sums the intermediate value for the neighbors to compute a predictor indicating the extent to which the center pixel is greater or less than its neighbors.

One way to implement this filter efficiently is to use a look up table. The look up table receives the result of the compare operations on the center pixel and each of the neighbors, and applies the appropriate combination of them to yield the predictor value. This implementation enables the predictive filter to be adapted efficiently by changing the weighting parameters and method of combining the intermediate values to calculate the predictor value.

The following sections describe an example implementation in more detail. FIG. 1 is a flow diagram illustrating this implementation of adaptive prediction filtering. In this example, the host signal 100 is an image comprised of an array of spatial domain pixels, and these spatial domain pixels are adjusted to embed a known watermark signal and a variable watermark signal. This implementation uses multiple stages of adaptive filtering. First, before detecting the presence of a digital watermark in a suspect image, it analyzes characteristics of the suspect image on a block-by-block basis to determine the appropriate filter to be applied to the image before watermark synchronization (102, 104). After synchronizing the watermark (106), a second stage of analysis analyzes known watermark signal elements by comparing the expected signal with the observed signal (108, 110). The statistics of this analysis dictate the parameters of a non-linear filter used to extract message symbol elements from the image.

In the watermark detector, the process begins by partitioning an input image into blocks. Next, the detector analyzes the image signal 100 to extract features from each block (102). Examples include variance, the distribution of neighboring pixel differences, and edge count. Many others are possible.

For each block, the detector chooses an appropriate non-linear filter for the measured local image characteristics (104). The appropriate non-linear filters have been defined by training the watermark system on a set of expected similar image samples.

The training set consists of a set of typical images for a particular application. For example, we might expect that in a typical usage scenario, a watermarked document is placed upon a flatbed scanner for authentication. If we can restrict the variance in the training set to some degree, we expect to be more successful in choosing the appropriate non-linear filter.

For all images in the training set, our training program partitions the images into blocks and extracts relevant image features (e.g., variance, edginess, etc., etc.) from each block. Since the images are training samples, we know a great deal about them including the embedded watermark pattern. By trying possible filter candidates on the training set, our training program finds a non-linear filter that when applied to each image block yields good correlation with the watermark pattern. One way to accomplish this is through trial and error at the watermark synchronization stage. The training program applies each non-linear filter and executes the watermark synchronization process, which entails performing correlation between the known watermark pattern and the filtered image blocks of images in the training set. The better the correlation value, the better the filter. Another way to perform this training process is during the read stage, assuming that the detector is able to achieve synchronization. The next section describes that procedure. We point out that a combination of the two approaches may be used.

Next, the training process generalizes the non-linear filters found in the previous step. By matching image characteristics to the choice of non-linear filters, the training process derives a general mapping between image characteristics and non-linear filters, and stores these mappings in the watermark detector.

In one example application, we tried two types of multi-axis non-linear filters. In each case, the axes refer to the direction between a center pixel of interest and one of the neighbors. One type of filter returns as an intermediate result, the difference between the average of the vertical neighbors (top and bottom axes) and the center pixel, and the difference between the average of the horizontal neighbors (left and right axes) and the center pixel. If the sign of the two intermediate results agree, the output of the filter provides an estimate of the pixel value, namely either an upward or downward adjustment. If the sign does not agree, the output of the filter provides no estimate. This filter may be altered by analyzing different axes, including diagonal axes, and weighting the contribution of each axes. A second type of filter compares the center pixel with each of its neighbors to produce intermediate results. It then weights and sums these intermediate results to provide an estimate of the pixel value.

We have observed that the first type of provides better detection in high variance images, while the second type provides better detection in less variance images.

This first stage of adaptive filtering provides a synchronized suspect image (106). For more details on a synchronization process see U.S. Pat. No. 6,122,403 and U.S. application Ser. No. 09/503,881 (now U.S. Pat. No. 6.614.914), incorporated above.

After the synchronization stage, the detector has identified the known watermark signal. The variable watermark, which includes a multi-bit watermark payload and error correction bits per block, is still unknown.

After correcting for affine distortion of the block with the synchronization parameters (rotation, scale, translation, differential scale, etc.), the detector has transformed the suspect image so that it is in the watermark coordinate system, meaning that it is aligned with the original watermarked image.

The detector includes bins based upon the absolute value of pixel differences. In an eight-bit single channel image, for example, the minimum absolute value difference is 0 and the maximum is 255. One bin, for example, collects pixel differences between 10 and 15. The following table provides an example of the bin structure.

| Bin Number | Absolute Difference |
| --- | --- |
| 1 | $|d| <= 2$ |
| 2 | $2 < |d| <= 4$ |
| 3 | $4 < |d| <= 6$ |
| 4 | $6 < |d| <= 8$ |
| 5 | $8 < |d| <= 10$ |
| 6 | $10 < |d| <= 12$ |
| 7 | $12 < |d| <= 14$ |
| 8 | $14 < |d| <= 16$ |

-continued

| Bin Number | Absolute Difference |
| --- | --- |
| 9 | $16 < |d| <= 20$ |
| 10 | $|d| > 20$ |

The detector divides the image into blocks. For each block and each pixel in the block, the detector performs the following operations:

1. Compute the difference between the center pixel and its left-hand neighbor. In accordance with the absolute value of this difference, find the appropriate bin (108).

2. Extract the polarity of the just calculated difference. If the polarity of the difference agrees with the polarity of the known watermark at that location, add 1 to the bin's agreement buffer. If it disagrees add a −1 to the same buffer. In either case add 1 to the bin's count buffer (110).

3. Repeat steps 1 and 2 for the other 7 surrounding pixels. In some cases it may be a good idea to treat the diagonal neighbors and the cross-wise neighbors separately.

For each block and each bin, the detector divides the bin's agreement buffer value by its count buffer value to get the bin correlation value.

In practice, there are cases where bins do not receive enough counts to be statistically reliable. Such bins are consolidated with neighboring bins and statistics are calculated using the conglomerate.

The detector includes a look-up table version of a filter that has an output for every possible pixel difference in an image of appropriate resolution.

1. For example, in an 8-bit image the table would have output values for every pixel difference between −255 and +255.

2. Recall that each bin is associated with a range of pixel differences. For the range of positive pixel differences that correspond to a particular bin, the detector assigns filter output values proportionate to the bin's measured correlation. The detector assigns the opposite value to the corresponding mirrored negative range of the filter (112).

Finally, the detector loops back through the block and applies the adapted filter to each pixel difference to extract the unknown portion of the watermark (114). The detector repeats this process for all of the blocks.

In this case, the procedure as a whole can be called matched filtering according to recovery statistics. It is as if each bin has a different watermark signal power, and the detector is matching its prediction filter to the associated signal power in each bin.

The same principle can be applied to other filter types. For example, instead of looking at neighboring pixel differences, we can consider the distribution of differences between the center pixel and various averages of its neighbors.

Although we have treated the pixel differences as independent entities, it is not necessary and may be sub-optimal to do so in some cases. The other pixel differences in the neighborhood may also be taken into account when deciding the contribution from each axis. Bayesian statistical updates can be made to the detector filter over time.

It is important to note that the watermark message reading procedure can be implemented efficiently in conjunction with the adaptive prediction filter. Since the prediction filter has computed the relative pixel values of each pixel and its neighbors, there is no need to loop back through the data once the filter has been defined.

One way to perform the binning is to create another look-up-table that runs between 0 and 255. A consecutive range of entries in the look up table indexes the appropriate bin.

This version of the detector also uses this look up table to index a discrete set of signatures, one per bin. (We note that the term "signature" in a first implementation represents a map or collection of data. In another implementation, a signature represents a demodulation of watermark chips into error correction encoded raw message symbols.).

When a difference is calculated it is assigned to the appropriate signature, and the right bit within it is incremented or decremented. When the detector is done calculating statistics on the current block, it combines the signatures, weighting them proportionately to the corresponding bin's measured correlation.

Fragile Watermark Applications

The statistics generated by analyzing expected and observed watermark signal can be used to authenticate a document.

Figure 2:
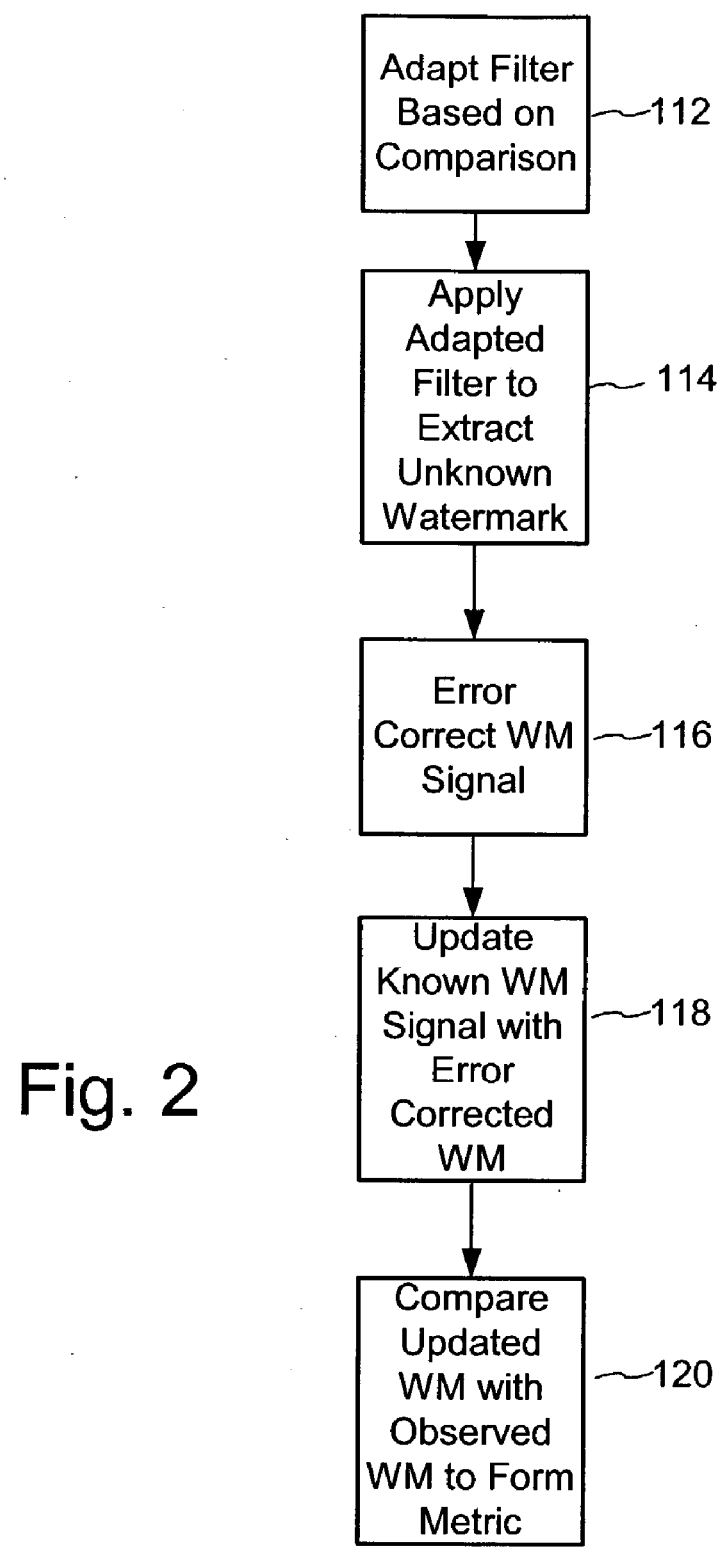
FIG. 2 is a flow diagram illustrating the use of adaptive prediction filtering as a metric for measuring a digital watermark.

Using the above method, the statistics indicating the differences between the expected and observed message bits can be extended to all of the message bits in the watermark, including both the known and variable message portions of the watermark message payload. FIG. 2 is a flow diagram illustrating the use of adaptive prediction filtering as a metric in measuring the watermark signal. After using the adaptive filter to read message estimates for the variable bits (e.g., blocks 112 and 114 in FIG. 2), the detector applies an error correction decoding process on the message estimates for the variable message bits to generate error corrected variable message payload (116). Knowing the spread spectrum key used to spread spectrum modulate the variable message, the detector can then convert the error corrected variable message into a known watermark signal. Now, in addition to the original known watermark signal, there is an additional expected watermark signal that can be compared with the observed watermark signal (e.g., the known watermark signal is updated with the error corrected data as shown in block 118). This enables the detector to generate detailed detection statistics for locations throughout the image. Based on these statistics showing the difference between the expected and the observed, the detector can measure the degradation of the watermark signal (120). If the degradation exceeds a metric, such as a threshold, then the document or other content item is deemed to have been altered. One specific application is copy detection for a document, where the alterations indicate that the image has been scanned from a reproduced document (e.g., by another generation of scan and print) rather than an original.

In some cases the filters derived above will be different for authentic documents than for counterfeit documents. Training sets of originals and counterfeit documents may be used to provide a characterization of what the bin correlation statistics are for the originals and certain types of counterfeits a priori. These characterizations are then built into the detector, which classifies a document as an original or counterfeit based on the observed statistics of the differences between the known and observed watermark signal.

By applying a filter based upon the a priori bin correlation statistics of the original, the detector can maximize the correlation strength, and hence detection metric, of original documents relative to counterfeit documents. This works particularly well if the watermark signal is almost always stronger in originals than in counterfeits.

Another possibility is to store the a priori bin correlation statistics of both originals and copies. When a candidate sample is to be authenticated, the detector calculates the bin statistics as described above. The document is more likely to be an original if its statistics more closely resemble those of the class of originals than any of the classes of copies. For cases where we do not know the counterfeit statistics, the detector is preferably programmed to check whether the document's measured statistics are close enough to the set of originals.

The above authentication method works particularly well in applications where the set of possible originals is relatively small, there are several likely counterfeiting methods, the originals and each type of counterfeit have their own characteristic bin correlation statistics.

Using the authentication method, it is possible, given an unknown document, to determine with relatively high probability whether the document is an original or a counterfeit (and in addition the type of counterfeit). This method extends to other signal types like video, audio and digital photographs, and can be used to detect alterations due to malicious attack (e.g., cropping, swapping, averaging, etc.) as well due to channel processing (compression, digital to analog, and analog to digital conversion).

Watermark Embedder Enhancements

A similar analysis of a known watermark signal can be used at the embedder to optimize the watermark for certain applications. For example, the embedder can modify the natural watermark bin correlation statistics of the host signal at the embedder to create a semi-fragile watermark in that host signal. In particular, the watermark signal is tuned to have properties that are likely to change in response to a particular type of alteration (e.g., a scan and print operation, compression, etc.).

By creating an unnatural, peaky distribution of the watermark statistics at the embedder, we expect that the distribution will spread in an amount commensurate with the number of reproductions of the digital image. The detector is designed to detect this spreading by measuring the distribution of the expected vs. observed watermark signal differences (as. for example. shown in block 138 of FIG. 3).

Figure 3:
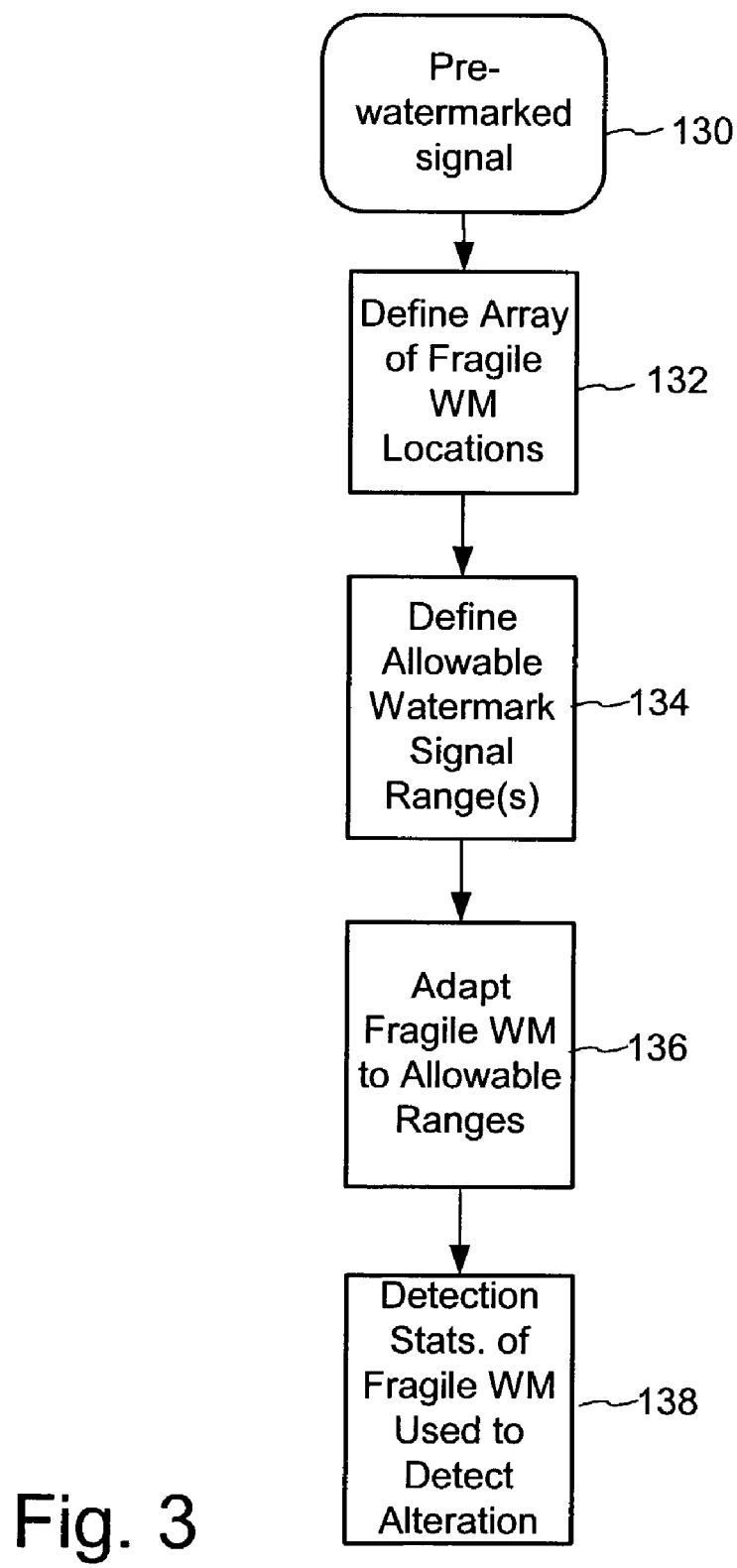
FIG. 3 is a flow diagram illustrating a method for adapting a digital watermark signal in an embedder so that it may be used as a metric for detecting certain types of alterations to a host signal.

Below, we describe a possible implementation with an accompanying illustration in FIG. 3:

1. Begin with a pre-watermarked image and make modifications to that image (130).

2. Modify on a sparse array so that we do not have inter-symbol interference, and so that we do not distort the robust portion of the mark (e.g., the robust portion may be a separate signal component to carry a robust payload, such as a content identifier and/or index to a database) (132).

3. Define an illegal interval for pixel differences, something like 0-L (134).

4. For all cases where the pixel change due to the watermark signal is in agreement with the observed pixel difference and that pixel difference is within the illegal interval, adjust the center pixel so that its new difference is outside the illegal interval (greater than L or less than 0.) (136).

5. The correlation will now be negative within the illegal interval and more positive outside of it.

Some refinements include:

The interval size could be adaptive. For example, in higher variance image areas the underlying differences are larger, and the illegal interval should scale accordingly.

To design for a specific workflow, one would "train" the system on a number of images by following pixel differences through the system. For example, given the pixel difference and the local image characteristics, what is the expected value and variance of pixel differences after printing and scanning? Once the parameters are measured, the embedder adjusts the difference so that it is outside the illegal interval with high probability, e.g., it sets the difference so that it is part of a distribution of pixel differences that have a small chance of making it into the illegal interval after an authentic printing and scanning.

Figure 4:
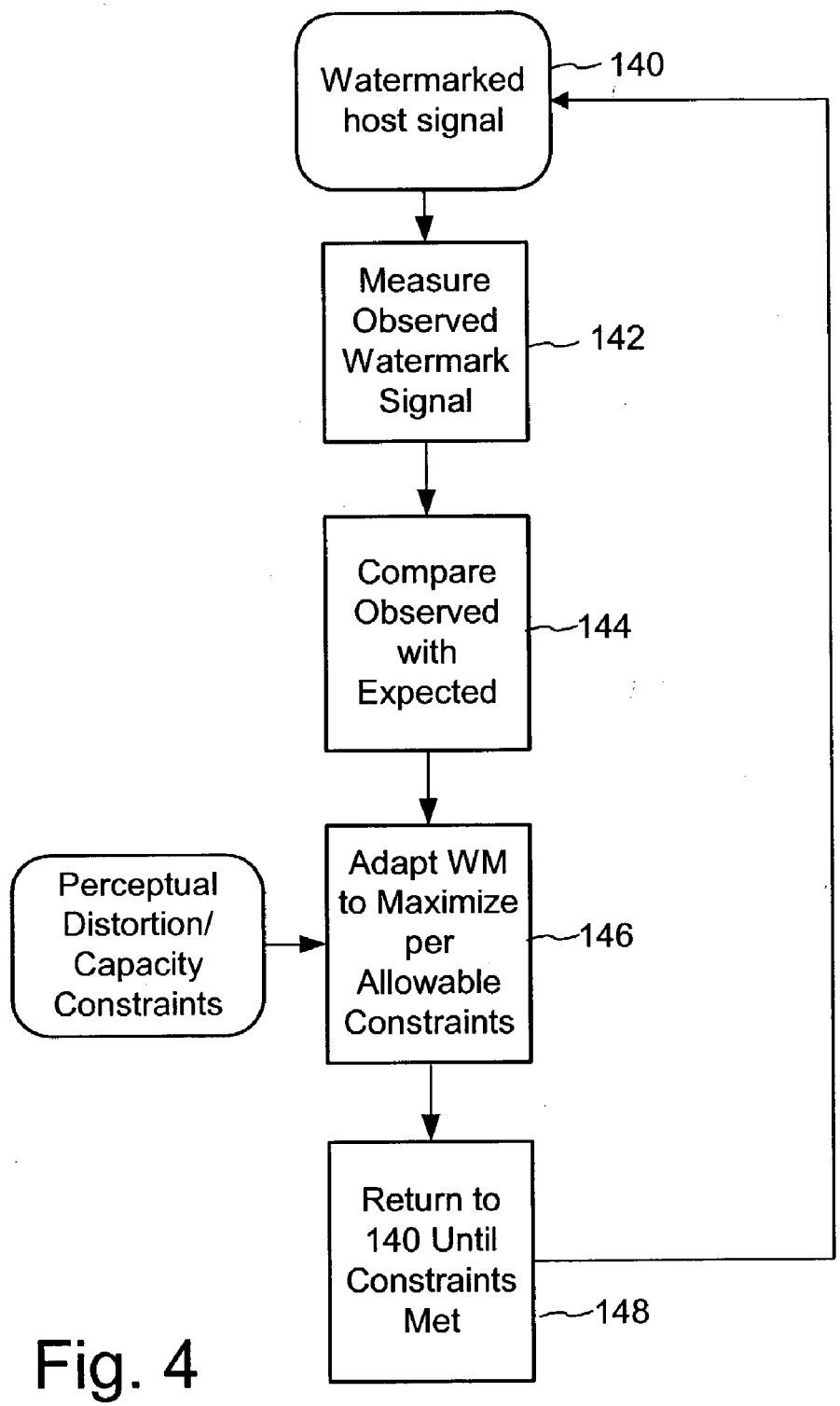
FIG. 4 is a flow diagram illustrating a method for adapting a digital watermark in an embedder so that it is optimized for detection using prediction filtering.

Another watermarking embedding enhancement is to use the parameters of the adaptive prediction filters in the detector to optimize the watermark signal in the embedder to improve detection for a given amount of perceptual degradation and watermark capacity as shown in FIG. 4. In this enhancement, the embedder analyzes the expected vs. observed watermark signals (as shown in blocks 142, 144) in the host signal (140) and adjusts the relationship between a pixel value and neighboring values so that the difference maximizes the desired watermark signal for a given amount of acceptable distortion (146). This analysis may be performed iteratively on the original host, and on subsequent versions that have been embedded with the digital watermark (148). On each iteration, the embedder adjusts the relationship between a pixel and its neighbors to optimize the watermark signal energy within a given amount of acceptable distortion, measured by the maximum amount of change to a given pixel. This technique applies to other host signal types and other embedding functions that modify relationships between features in the host to encode watermark signal elements.

The embedder can adapt the host signal watermark for optimal detection for a particular non-linear predictive filter or class of filters, such as the look up table implementation described above. Further, the watermark payload can be encoded with an index that indicates the optimal type of prediction filter to use in analyzing suspect signals. This approach may be applied for fragile watermarking schemes where the watermark payload carrying the filter information is robustly embedded and then extracted in suspect signals to adapt the detector to the optimal filter.

The use of adaptive prediction filtering may be used in a number of digital watermarking protocols to improve detection of digital watermark layers that carry different information or perform different functions. One such protocol is where the digital watermark is comprised of two or more layers of digital watermarks, each carrying different information. One example is provided above, where the known watermark detected in the initial detection and synchronization stage is a first layer and the unknown, variable-message carrying watermark is a second layer. Another example provided above is the use of a robust watermark (e.g., to carry a robust payload such as a content identifier and/or index to a database) and a second, semi-fragile watermark in a sparse array.

An additional example is a protocol with a first watermark layer that employs a fixed protocol and carries a variable message indicating the protocol of a second watermark layer. This protocol enables the protocol of the second layer to be extensible with different coding formats (error correction and/or repetition coding), payload length and payload symbol mapping to host signal elements. Another example is a protocol with a first watermark layer that includes a variable payload per content item, but is repeated in blocks or tiles across each content item, such as an image, frame or audio clip. The second or subsequent layer carries a payload that varies from block to block to provide a block identifier within a particular content item, such as an image, frame or audio clip. An advantage of this approach is that it enables individual blocks to be uniquely identified in cases where the content is cropped, spatially scaled, or geometrically/temporally distorted in some other way after embedding the digital watermark. In particular, in images of geographic information, each block within an image may be associated with unique coordinates referenced in the variable block watermark payload, such as unique geographic coordinates. In large medical images, each block within the image may have a unique block identifier or set of coordinates that identifies that block within a much larger image. As these images are manipulated and saved in derivatives, the digital watermark detector is able to identify where individual blocks came from within the original larger image.

Another enhancement based on adaptive detection is to iterate watermark message decoding over two or more iterations, each time using message symbol reliability statistics to refine the message decoding from the previous iteration. As an example, consider a protocol where the accuracy of portions of the message is evaluated with error detection checking (e.g., using a sub-portion of the message bits in a particular portion to do error checking, such as with a CRC check). With each iteration, the detector evaluates the reliability of the portions of the watermark, such as using error detection or checking whether certain fixed, false positive message bits agree with expected values. If certain portions are detected unreliably (e.g., they fail error detection), then the message data decoded reliably is used in a subsequent iteration along with the data decode unreliably to decode the digital watermark message. In the subsequent iteration or iterations, the reliably decoded data is weighted more heavily in the process of adapting the prediction filters used to extract the embedded message symbols. This approach improves detection in cases where digital watermark message data has been corrupted due to distortions of the host signal after embedding.

In the subsequent iteration or iterations, the reliably decoded data is used as the primary source in terms of updating the adaptive filter. However, there may not be enough of this data relative to the total amount of variable data in order to get an accurate statistical characterization of what the filter should be. A secondary source for updating the adaptive filter consists of our best estimate for the remaining payload bits. Although some of these bits will be in error as indicated by the error detection process, the majority of the bits should be error free. The secondary source of bits is used in conjunction with the primary, but with a smaller weighting factor due to the fact that the source is less reliable. This iterative method is particularly useful when either no synchronization signal is used, or when the per element statistics of the synchronization signal are sufficiently different than the statistics of the variable data.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of digital watermark detection comprising:
computing signal characteristics of a host digitally watermarked signal;
adapting parameters of digital watermark prediction in the watermarked signal based on the signal characteristics; the adapting of parameters including selecting locations in the host digitally watermarked signal from which the digital watermark is predicted based on the signal characteristics.

2. The method of claim 1 wherein the digital watermark prediction predicts an estimate of an embedded digital watermark signal element based on comparison of a host signal value and one or more other related values.

3. The method of claim 1 wherein the parameters correspond to a type of prediction filter that is selected based on the signal characteristics.

4. The method of claim 1 wherein the digital watermark prediction predicts an estimate of an embedded digital watermark signal element based on comparison of a host signal value and one or more other related values, and the parameters correspond to a type of prediction filter that is selected based on the signal characteristics.

5. A computer readable, tangible medium on which is stored instructions for performing the method of claim 1.

6. A method of digital watermark detection comprising:
computing observed values of a variable, unknown watermark signal in a host digitally watermarked signal;
comparing the observed values of the variable, unknown watermark signal with known watermark signal values at corresponding portions of the watermarked signal;
based on comparing the observed with the known values, adapting digital watermark prediction used to extract a message from the unknown watermark signal such that the prediction is adapted according to an extent of the agreement between the observed and known values.

7. The method of claim 6 wherein the digital watermark prediction predicts an estimate of an unknown watermark signal element based on comparison of a host signal value and one or more other neighboring values.

8. The method of claim 6 wherein the known watermark represents a previously detected watermark layer in the watermarked signal, and the unknown watermark represents a subsequent watermark layer to be detected in the watermarked signal.

9. The method of claim 8 wherein the previously detected watermark layer comprises a watermark variable message payload that has been error corrected to compute the known watermark signal.

10. The method of claim 8 wherein the previously detected watermark layer comprises a synchronization watermark.

11. The method of claim 8 wherein the subsequent watermark layer carries a message payload that varies from one block to another in the watermark signal to provide a block identifier per block.

12. The method of claim 6 wherein the method is used iteratively to detect a digital watermark, and with each iteration, data on reliability of portions of the digital watermark is used to weight the prediction in a subsequent iteration such that more reliable portions are weighted more heavily than less reliable portions.

13. The method of claim 6 wherein detection statistics based on a comparison of observed relative to known watermark signal values are used as a metric for detecting alteration of a watermarked signal.

14. The method of claim 13 wherein the method is used to distinguish a copy from an original printed document from a digital watermark embedded in the document.

15. A computer readable, tangible medium on which is stored instructions for performing the method of claim 6.

16. A method of digital watermark embedding in a digital watermarking system where a digital watermark is extracted by predicting a digital watermark based on application of a predictive filter to values of signal elements in a digitally watermarked signal, the method comprising:
computing an initial value of a digitally watermarked signal element in a host signal;
adjusting a relationship between the initial value of the digitally watermarked signal element and other elements in the digitally watermarked signal used as input to the predictive filter to extract the digital watermark such that an embedded signal watermark is optimized for extraction by prediction with the prediction filter based on desired embedding constraints; and
repeating the computing and adjusting to optimize embedding of additional data in the watermarked signal.

17. The method of claim 16 wherein the adjusting is performed for selected parts of the digitally watermarked signal to enable the digital watermark to be optimized for detection of alteration of the watermarked signal by analyzing the digital watermark in a detector after the watermarked signal has been transmitted from the digital watermarking system.

18. The method of claim 17 wherein the digital watermark is embedded such that watermark detection using prediction is optimized to distinguish between an original and a copy of a watermarked document by detecting a change in the digital watermark caused by degradation of the watermarked signal that occur during a process of creating the copy.

19. The method of claim 16 wherein the digital watermark is optimized to maximize digital watermark signal detection statistics for a desired amount of perceptual distortion.

20. A computer readable, tangible medium on which is stored instructions for performing the method of claim 16.

* * * * *